UNITED STATES PATENT OFFICE.

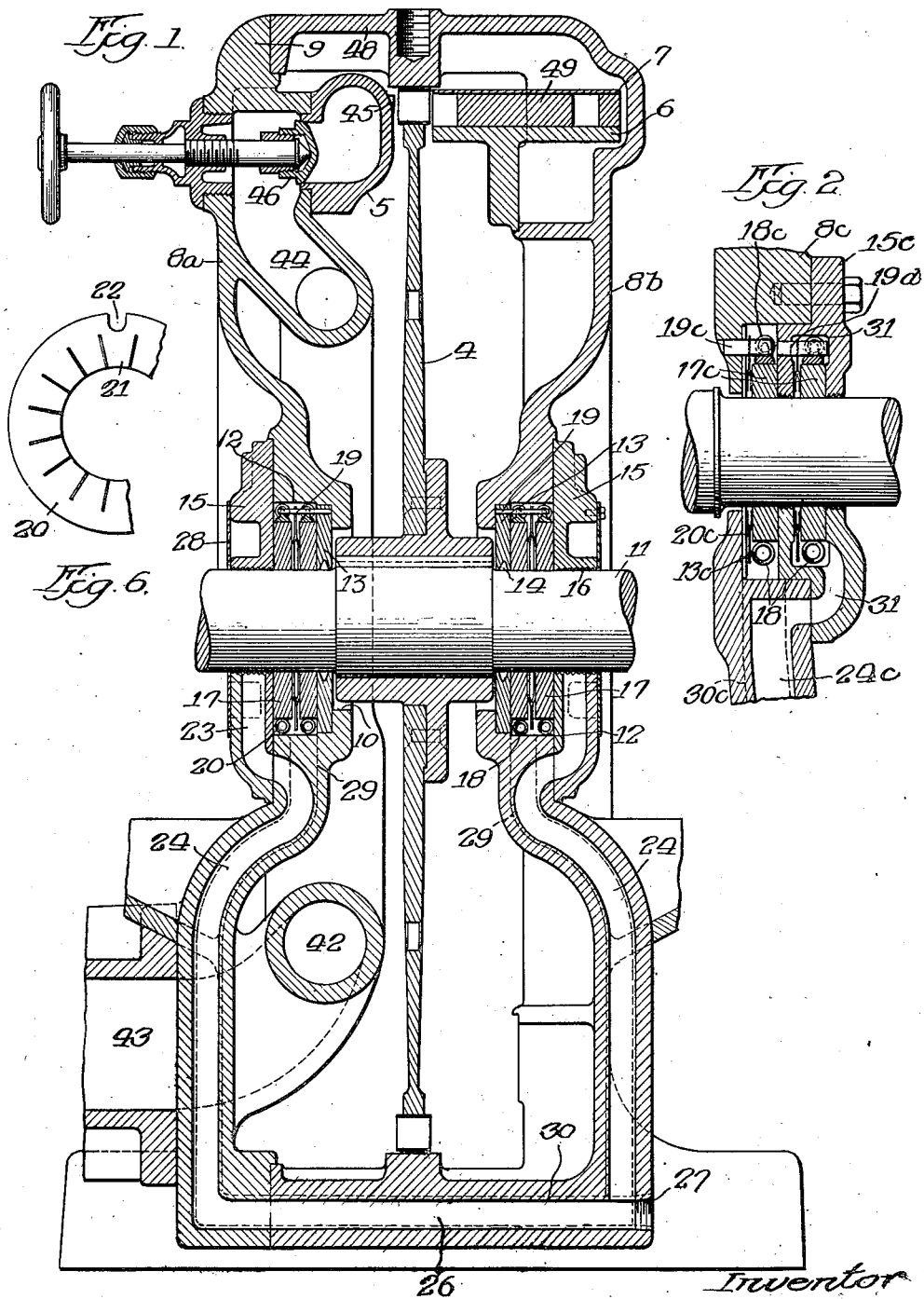

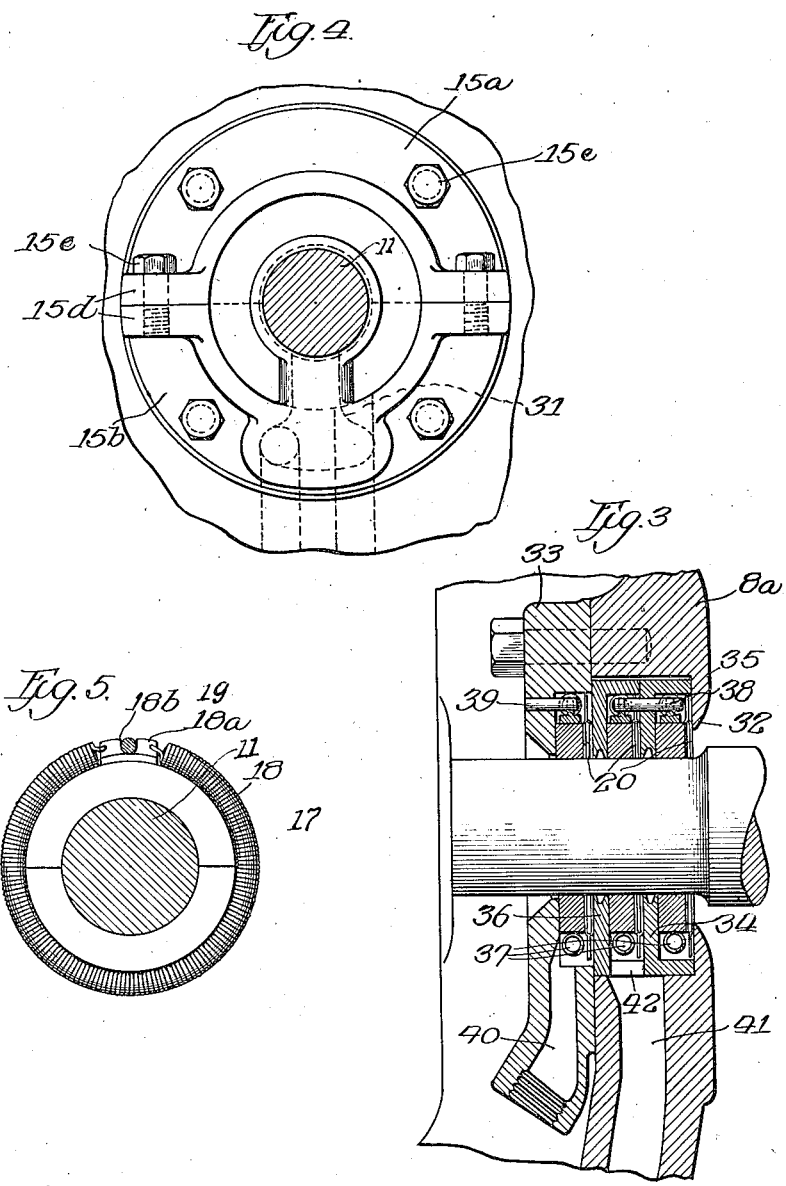

HENRY H. WAIT, OF CHICAGO, ILLINOIS, ASSIGNOR TO MIDWEST ENGINE COMPANY, OF INDIANAPOLIS, INDIANA, A CORPORATION OF INDIANA.

PACKING FOR ROTARY SHAFTS.

1,377,143.  Specification of Letters Patent.  Patented May 3, 1921.

Application filed August 28, 1916. Serial No. 117,166.

*To all whom it may concern:*

Be it known that I, HENRY H. WAIT, a citizen of the United States, residing at Chicago, in the county of Cook and State of Illinois, have invented certain new and useful Improvements in Packings for Rotary Shafts, of which the following is a specification.

My invention is designed more especially as a steam packing for use in steam turbines, but as will appear from the following detailed description it is also applicable to the packing of rotary shafts in general and other parts where similar conditions exist.

In the accompanying drawings and the following description I have described in detail preferred embodiments of my invention. It is to be understood, however, that the specific disclosure is for the purpose of exemplification only, and that the scope of the invention is defined in the following claims in which I have endeavored to distinguish it from the prior art so far as known to me without, however, relinquishing or abandoning any portion or feature thereof.

Referring to the drawings, Figure 1 is a vertical axial section through the turbine embodying my improvements, certain parts, however, being shown in elevation; Figs. 2 and 3 are similar but fragmentary views or modifications thereof; Fig. 4 is an elevation showing that form of the invention disclosed in Fig. 1; and Figs. 5 and 6 are elevations of details, the former showing the shaft in section.

For the present purpose the particular form of the turbine wheel 4 is immaterial. The casing 8 is shown as divided upon a vertical plane and composed of two castings 8$^a$ and 8$^b$ bolted together in the usual manner, though, if desired, the casing may be formed of castings separable upon a horizontal plane, as will be obvious to those skilled in this art. The castings 8$^a$ and 8$^b$ are each formed with an opening 10 for the passage of the wheel shaft 11, and about said openings the castings are formed with annular packing chambers 12, which are provided with packings for preventing the escape of steam. Each of these chambers is formed or provided at its bottom with an annular diaphragm 13 grooved at 14 where it fits about the shaft, to so far as possible, without undue closeness of fit, prevent the escape of steam from the casing. In the form of the invention shown in Fig. 1, the packing chamber is provided with a cover or cap 15, which is bolted or otherwise secured to the casing and formed with a tapped or grooved interior 16, a common expedient for minimizing the escape of steam. The chamber 12 in the form shown in Fig. 1, is provided with a pair of sectional rings 17 of graphite of known form, which fit tightly about the shaft 11, the sections of which are maintained together and in close fit about the shaft by spiral spring garters 18, provided with saddle pieces 18$^a$. The garters, and consequently the graphite rings, are held against rotation by pins 19 secured in the diaphragm 13, and engaging the notches 18$^b$ in the saddle pieces. The graphite rings in each chamber are two in number and are caused to bear respectively against the diaphragm and cap or cover by a spring plate 20 interposed between said rings. Said plate, which is illustrated in Fig. 6, is radially slitted to form fingers 21, which are alternately bent in opposite directions, as shown in Figs. 1 and 2. The spring is also notched at 22 for the pin 19 and when inserted between the graphite rings, as shown in Fig. 1, serves to force them against the inner and outer walls respectively of the chamber. The caps or covers 15 are formed with drainage eduction channels 23, which communicate with the grooved bore and serve to carry away drainage which escapes past the graphite rings, said channels communicating with channels 24, cored in the walls of the casing. The channels 24 upon the respective sides of the casing are connected together by a transverse channel 26 leading to a tapped opening 27, for the reception of a pipe to lead away the drainage. In order further to guard against the escape of steam annular plates 28 are secured to the caps 15 and closely surround the shaft 11.

In addition to the drainage channels 24 to which reference has been made the casing is also cored or formed with a pair of channels 29 shown in dotted lines in Fig. 1 which communicate with the respective chambers 12 upon opposite sides of the casing and, like channels 24, are connected by a transverse channel 30 having provision for the attachment of a drain pipe. The steam in chambers 12, while at a lower pressure than that in the casing, is at a higher pressure than that which escapes past the outer packing rings 17 along the shaft and into channels 23 and for this reason channels 23 are maintained out of communication with channels 29 and lead to separate drain pipes.

In Fig. 2 a modification of the invention is shown in which the casing is or may be formed as in the embodiment already described. The casing is designated by the numeral 8ᶜ and the bottom of the packing chamber is likewise closed by the diaphragm 13ᶜ. Two packing rings 17ᶜ are also employed but they are in separate chambers, the inner ring being in the chamber formed in the casing but the outer ring in a chamber 31 formed in the cap or cover 15ᶜ. The sections of the packing ring are held together by the pressure of helical spring garters 18ᶜ surrounding the periphery thereof and rotation of the garters and rings is prevented by pins 19ᶜ, 19ᵈ secured respectively in the wall of the casing and the inner wall of the cap. Each of the packing rings is pressed outwardly by a spring 20ᶜ like that shown in Fig. 6, the inner ring being pressed against the inner face of the cap and the outer ring against the outer wall of the cap. The cap is formed with a cored drainage channel 31 connecting with the packing chamber formed in said cap, and with a drainage passage 24ᶜ cored in the casing. As shown in Fig. 4, the passage 31 is enlarge at its outer end to communicate with the passage 24ᶜ, whether the latter is on one side or the other of the median line of the casing. By reason of this enlargement it is possible to use the same cap for either shaft opening in the casing. The cap is secured to the casing as usual, by bolts 15ᵉ.

The modification of the packing shown in Fig. 3 is particularly useful where higher pressures are to be used and in this form I provide for three packing rings which number may obviously be increased by mere multiplication of the structures shown. The casting 8ᵃ is chambered as before, about the shaft opening 32 and in this instance the inner wall or diaphragm of the packing chamber is formed integral with the casing. The chamber is formed to contain two of the packing rings, the third ring being inclosed within the cap 33. The packing rings are similar or identical in construction with those heretofore described, but are separated and partially surrounded by flanged disks 34, the flange of the inner disk surrounding the innermost packing ring and bearing upon the diaphragm or wall 35. The outer disk 36 is turned with its flange to abut against the first said flanged disk and closes the opening between the chamber in the casing wall and the packing chamber 37 formed in the cap 33. A pin 38 anchored in the innermost flanged disk projects in opposite directions and engages the saddle pieces of the spring garters of the packing rings on opposite sides thereof, and a pin 39 performs a similar function with respect to the garter of the packing ring in the cap or cover plate. The cover plate is drained by a passage 40 formed therein and communicating with the packing chamber and a drain passage 41 is cored in the casing and communicates through an opening 42 in the outer flanged disk with the chamber surrounding the outer packing ring in the casing. A spring disk 20 similar to that shown in Fig. 6 serves to press each of the packing rings against the outer wall of the chamber in which it is inclosed.

It will be noted that by the use of a spiral thread 16 in the shaft openings rather than circular grooves, sharp edges are presented to retard the passage of steam, and at the same time marking or grooving of a shaft is prevented because the grooves are at an angle thereto.

I claim:

1. In a device of the class described, the combination of a casing having oppositely disposed openings therein, a rotary shaft extending through said openings, packing chambers formed in the casing about said openings and shaft, inwardly projecting flanges at the inner ends of said packing chambers, diaphragms fitting against the respective flanges and closely surrounding the shaft, caps closing the outer ends of the respective packing chambers, each having an opening through which the shaft passes and a duct extending from said opening and opening through said cap, a pair of packing rings in the chamber bearing against said diaphragm and cap respectively, drain passages formed in the casing connecting with the passages in the cap and other and independent drain passages connecting with the packing chamber.

2. The combination of a casing having an opening therein, a shaft extending through the opening, a cap closing the outer end of the chamber, an opening in the cap and a drain passage formed in the cap and communicating with the opening therein, and a drain passage formed in the casing with which the passage in the cap communicates.

3. The combination of a casing having an opening therein surrounded by a packing chamber, a shaft extending through the opening and chamber, a cap closing the outer end of the chamber, a pair of rings arranged in the chamber about the shaft and a spring intermediate the packing rings, comprising an annulus of spring metal radially slitted to form fingers, said fingers being bent in opposite directions with respect to the plane of the ring.

4. A spring for exerting pressure against the packing, comprising a sheet metal annulus radially slitted to form fingers, the fingers being bent in opposite directions with respect to the plane of the ring.

5. The combination of a casing having an opening and packing chamber therein, a shaft extending through the opening and chamber, a diaphragm closing the inner end of the chamber, a cap closing the outer end of the chamber, a pair of packing rings in the chamber, and a spacing spring separating said packing rings, said spring being circular in form and provided with fingers extending in opposite directions from the plane of the spring.

6. In a turbine, the combination of a casing having an opening in the wall thereof, a shaft extending through the opening, a cap for closing the opening in the casing and through which the shaft extends, a packing chamber in the cap about the shaft, a packing in said chamber, a drain passage connecting with the chamber in the cap, and a drain passage in the casing for receiving steam from the drain passage in the cap.

HENRY H. WAIT.